3,557,254
POLYMERIZATION PROCESS
Rudolf Friedrich Bauer, Kingston, Ontario, and Edward Blake Storey, Sarnia, Ontario, Canada, assignors to Polymer Corporation Limited, Sarnia, Ontario, Canada, a body corporate
No Drawing. Filed June 29, 1967, Ser. No. 649,862
Claims priority, application Canada, July 22, 1966, 966,078
Int. Cl. C08f 15/40
U.S. Cl. 260—879         5 Claims

ABSTRACT OF THE DISCLOSURE

A process for the production of transparent thermoplastic copolymers of the acrylonitrile-butadiene-styrene type. Polymerization is conducted in the presence of an organic diperoxide having peroxide groups activatable at different temperatures and the process steps include (1) polymerizing at a low temperature butadiene alone or in admixture with styrene and/or acrylonitrile, (2) adding butadiene and/or styrene and/or acrylonitrile monomer(s) and (3) polymerizing the added monomer(s) at a higher temperature.

---

This invention relates to the polymerization of olefinic compounds. It particularly relates to consecutively polymerizing at least one monomer, a conjugated diolefin, at a low temperature followed by polymerizing at least one other monomer at a higher temperature.

The acrylonitrile butadiene styrene copolymers now available commercially are opaque and have a poor retention of impact strength at sub-zero temperatures. The resinous copolymers prepared by the process of the present invention are transparent; additionally, resins made by a particular embodiment of the inventive process show little change in impact strength between room temperature and —40° C. The transparency of the resins permits their use in applications such as the tail lights of cars, bottles, etc.; it also facilitates pigmentation of the resin with dark colors or tints. The retention of impact strength at sub-zero temperatures permits such resins to be used in low temperature service.

The process of the present invention comprises polymerizing at least three monomers in the presence of an organic diperoxide which comprises the consecutive steps of (a) polymerizing a conjugated diolefin or a mixture comprised of a conjugated diolefin and at least one monomer selected from an aryl olefin and a nitrile of an acrylic acid at a temperature of about —5 to less than 50° C., (b) adding at least one monomer selected from a conjugated diolefin, an aryl olefin and a nitrile of an acrylic acid and (c) polymerizing the added monomer or monomers at a temperature of 50 to 95° C., to produce a transparent thermoplastic segmented copolymer.

A conjugated diolefin monomer is used in the first polymerization step of the present invention. Included in this class of monomers are 1,3-butadiene, 2,3-dimethyl butadiene, isoprene, piperylene, 2-chloro 1,3-butadiene and the like. The preferred conjugated diolefin is 1,3-butadiene.

The monomeric materials which may be used in admixture with the conjugated diolefin monomer in the first polymerization step of the present invention comprise olefinically unsaturated organic compounds which can be polymerized by a free radical mechanism. Such compounds contain the characteristic structure $CH_2=C<$ having at least one of the disconnected valencies attached to an electronegative group such as a double or single bond, for example, phenyl, nitrile, carboxy or the like. Included in this class of monomers are the aryl olfins such as styrene alkyl styrenes, p-chloro-styrene, alpha-methyl styrene, vinyl naphthalene, acenaphthalene and derivatives thereof; nitriles and amides of acrylic and substituted acrylic acids such as acrylonitrile, methacrylonitrile, methacrylamide and the like; vinyl acetate, vinyl chloride, vinylidene chloride, vinyl pyridine and other unsaturated hydrocarbons, esters, amides and nitriles of the types described.

At least one monomer selected from a conjugated diolefin, an aryl olefin monomer and a nitrile of an acrylic acid is used in the second polymerization step of the present invention. As aryl olfins there may be used monomers such as styrene, alkyl styrenes, p-chloro-styrene, alpha-methyl styrene, vinyl naphthalene, acenaphthalene and derivatives thereof; the preferred aryl olefin is styrene. As nitriles of acrylic and substituted acrylic acids there may be used monomers such as acrylonitrile and methacrylonitrile; the preferred nitrile monomer is acrylonitrile. Suitable conjugated diolefins have been described previously.

The monomeric materials which may be used in admixture with the aryl olfin and the nitrile of an acrylic acid in the second polymerization step of the present invention are also selected from those unsaturated compounds previously described as being suitable for use in the first polymerization step.

The catalyst used in the first polymerization step is an organic diperoxide compound characterized in that its two peroxide groups can be decomposed or activated at different temperatures. It may be either aromatic or aliphatic having two independently functioning peroxy groups. The preferred catalysts are 2,5 - dimethylhexane-2,5 - dihydroperoxide and 2,5 - dimethyl - 2 - tertiary-butylperoxy - 5 - hydroperoxyhexane; the most preferred catalyst is 2,5 - dimethyl - 2 - tertiarybutylperoxy-5-hydroperoxyhexane. The amount of said catalyst used depends upon the properties desired in the final polymer; however, an amount in the range of about 0.02 to less than 0.5 part is generally used with a range of from 0.05 to 0.4 part by weight based on 100 parts of monomers being preferred.

The first polymerization step may be conducted in a conventional manner. An aqueous solution containing an emulsifying agent, and if and as desired an electrolyte, a buffering agent, a chelating agent, a reducing agent, an oxygen scavenging agent and a modifying agent is prepared and charged to a reactor in the absence of oxygen; the monomer or monomers are then charged to the aqueous solution, emulsified, and the reaction is initiated by the diperoxide catalyst. The mixture is agitated at a temperature betwen about —5 and less than 50° C. and preferably between 0 and 20° C. for at least 2 hours until a 20–100% conversion of monomer is obtained. The emulsifying agents which may be used in the aqueous polymerization process include anionic emulsifiers such as the fatty acid and/or rosin acid soaps, for example, sodium oleate, sodium palmitate, sodium stearate, potassium salt of disproportionated abietic acid, the high molecular weight aliphatic sulfates such as sodium lauryl sulfate, and the alkaryl sulfonates such as sodium isopropyl naphthalene sulfonate, sodium dodecyl benzene sulfonate, non-ionic polyethoxylated compound such as alkaryl polyether alcohols, as well as the salts of high molecular weight bases such as the hydrochloride of diethylaminoethyloleylamide, cetyltrimethyl ammonium methyl sulfate and lauryl amine hydrochloride. The preferred emulsifying agent is an anionic emulsifier. The emulsifying agent may be used in an amount of from 1 to 10 parts but a preferred range is from 3.0 to 5.0 parts by weight based on 100 parts of monomers. Mixtures of suitable emulsifiers may also be used.

The reducing agents which may be used in the aqueous emulsion polymerization process include ferrous sulfate, sodium sulfoxylate formaldehyde, iron and sugar, iron and pyrophosphate, etc. The preferred reducing agent is ferrous sulfate heptahydrate. The reducing agent may be used in an amount of from 0.01 to 0.5 part but a preferred range is from 0.015 to 0.07 part by weight based on 100 parts of monomers.

When required in the first polymerization step the electrolyte, buffering agent, chelating agent, oxygen scavenging agent and modifying agent are selected from appropriate commonly used chemicals; they may be employed in conventionally used amounts.

The first polymerization step is allowed to proceed to a conversion of at least 20% at which point the reaction is terminated by removing the unreacted monomer or monomers either by evaporation or by vacuum stripping. If desired, the reaction may be quenched by cooling to a temperature at which reaction practically ceases whereby residual monomers may remain.

Before conducting the second polymerization step, at least one monomer is added to the latex prepared in the first polymerization step. Other chemicals such as emulsifying agents, oxygen scavenging agents, modifying agents and water may also be added. The monomer or monomers used in the second polymerization step may be added together or separately prior to or during polymerization. The polymerization system comprising a prepolymer dispersion and freshly charged unreacted monomer or monomers is then agitated and heated to a temperature of 50 to 95° C., preferably within the temperature range of 70 to 90° C., at which polymerization occurs.

When modifying agents are added for use in the second step of polymerization, the amounts used may be in the range of from 0.1 to 6 parts and preferably from 0.5 to 4 parts by weight based on 100 parts of monomers. The modifying agents used are selected from appropriate commonly used chemicals.

When emulsifying agents and/or oxygen scavenging agents are added for use in the second polymerization step, they should be selected from appropriate commonly used chemicals and employed in those amounts previously described as being suitable in the first polymerization step.

The conversion of monomers which is permitted during the second step of polymerization will of course be dependent upon the composition and molecular weight desired in the final polymer.

The second step of polymerization is stopped after at least 2 hours. A shortstop which acts as a free radical scavenger and reacts with residual peroxide is commonly used. Suitable shortstops include sodium polysulfide, hydroquinone, amyl hydroquinone, and alkali metal salts of dialkyl dithiocarbamic acids such as sodium dimethyl dithiocarbamate and potassium dimethyl dithiocarbamate. A preferred shortstop is potassium dimethyl dithiocarbamate. The shortstop is added in an amount sufficient to terminate polymerization, an amount within a range of 0.01 to 1 part by weight based on copolymer being preferred.

The unreacted monomer or monomers are removed and the latex is coagulated by conventional means. The polymer is stabilized with a suitable antioxidant.

The transparent thermoplastic copolymers of the present invention are segmented. The term "segmented" is used to indicate that the copolymers contain segments of varying composition. In the first polymerization step a conjugated diolefin homopolymer or copolymer is made and in the second polymerization step at least one added monomer is polymerized onto the first step polymer; the final copolymer is a mixture of graft and block copolymers. Segments selected at random from such copolymers have different compositions.

In addition to the unexpected and superior transparency of the copolymers made by the process of this invention, it is also possible to prepare low temperature impact resistant copolymers by a refinement of the inventive process. For the purposes of this specification transparency is defined as the property of transmitting at least 40% of incident light of 620 millimicrons wavelength and at least 30% of incident light of 420 millimicrons wavelength through a 0.012 mm. thick test sample. Low temperature impact resistant copolymers are defined, for the purposes of this specification, as polymers which retain at −30° C. at least 65% of their impact strength at 25° C. and retain at −40° C. at least 35% of their impact strength at 25° C. When nitriles of acrylic and substituted acrylic acids, such as acrylonitrile, are copolymerized with the conjugated diolefin in the first polymerization step, the final copolymers have improved low temperature properties; that is, their retention of impact strength at low temperatures is much greater than that of copolymers made by the process of polymerizing the conjugated diolefin in the absence of nitrile monomer in the first polymerization step.

The following examples will better illustrate the invention. In these examples, all parts are by weight.

EXAMPLE I 100 parts of butadiene were charged to an oxygen-free solution of 4.0 parts of sodium dodecyl benzene sulfonate, 0.2 part of potassium chloride, 0.3 part of trisodium phosphate, 0.04 part of ethylene diamine tetracetic acid and 0.02 part of ferrous sulfate heptahydrate in 300 parts of water. 0.2 part of 2,5-dimethyl-2-tertiarybutyl-peroxy-5-hydroperoxy hexane were then added and the mixture was agitated at 13° C. The polymerization was allowed to proceed to a conversion of 46%. The unreacted monomer was substantially removed by bubbling nitrogen through the latex.

75 parts of styrene, 25 parts of acrylonitrile and 0.83 part of sodium alkyl aryl sulfonate dissolved in 167 parts of water were added to the latex. Polymerization was continued for 14 hours at 80° C. The reaction was then stopped by the addition of 0.2 part of a 2% aqueous solution of potassium dithiocarbamate. The unreacted monomer was removed by steam stripping. 2.5 parts of tri (nonylated phenyl) phosphate antioxidant were added, then the latex was coagulated with methanol. The polymer was dried at 60° C.

A knowledge of the conversion levels obtained at each stage of polymerization indicates the butadiene content of the copolymer was 30%. Analysis by the infrared and Dumas methods showed the copolymer had the composition 21% butadiene, 57% styrene, 22% acrylonitrile and 31% butadiene, 51% styrene, 18% acrylonitrile, respectively. Hence the composition of the copolymer was assumed to be 25±5% butadiene, 54±3% styrene and 20±2% acrylonitrile.

The properties of the transparent experimental copolymer are compared in Table I with those of a commercially available butadiene-styrene-acrylonitrile copolymer of similar composition.

TABLE I

| | Experimental copolymer | Control copolymer |
|---|---|---|
| Tensile strength at yield, kg./cm.$^2$ | 335 | 288 |
| Elongation at yield, percent | 5.3 | 4.2 |
| Flexural strength, kg./cm.$^2$ | 562 | 463 |
| Flexural modulus, kg./cm.$^2$ | 17,180 | 15,800 |

The flexural properties were determined using A.S.T.M. procedure D–790–63.

The above properties indicate the experimental copolymer has properties similar to commercial ABS copolymer.

EXAMPLE II

Three polymers were prepared by charging 100 parts of total monomers to oxygen-free solutions of 4.0 parts of sodium stearate, 0.2 part of potassium chloride, 0.3 part of trisodium phosphate, 0.06 part of ethylene-diamine tetracetic acid, 0.005 part of ferrous sulfate heptatydrate, 0.05 part of sodium hydrosulfite and 0.023 part of sodium sulfoxylate formaldehyde in 300 parts of water; two polymers (Samples 1 and 2) were made using 90 parts of butadiene and 10 parts of acrylonitrile and another polymer (Sample 3) was made using 80 parts of butadiene and 20 parts of acrylonitrile. 0.05 part of 2,5 - dimethyl-2-tertiarybutylperoxy - 5 - hydroperoxyhexane were then added and the mixtures were agitated at 13° C. A fourth polymer was prepared similarly to Sample 3 except that 4.0 parts of sodium stearate were replaced by 1.0 part of potassium oleate and 3.0 parts of a potassium salt of disproportionated abietic acid; this polymerization was conducted at 3° C. The polymerizations were allowed to proceed for several hours to conversions of between 20 and 40%. The unreacted monomer was substantially removed by bubbling nitrogen through the latices.

65 parts of styrene, 35 parts of acrylonitrile, 0.44 part of sodium stearate, 0.044 part of sodium hydrosulfite and 174 parts of water were then charged and the mixtures were agitated between 50 and 80° C. The polymerization reactions were allowed to proceed to conversions of between 20 and 30%. The reactions were then stopped by the addition of 0.2 part of a 2% aqueous solution of potassium dithiocarbamate. The unreacted monomer was removed by steam stripping. 2.5 parts of tri(nonylated phenyl) phosphite antioxidant were added, then the latex was coagulated with a mixture of brine and hydrochloric acid. The polymer was dried at 60° C. under low vacuum.

The properties of the transparent low temperature impact resistant copolymers are recorded in Table II.

TABLE II

| | Polymer Sample | | | |
|---|---|---|---|---|
| | 1 | 2 | 3 | 4 |
| Polymer Composition: | | | | |
| Percent acrylonitrile | 18.7 | 21.3 | 24.3 | 24.1 |
| Percent butadiene | 36.2 | 20.1 | 14.2 | 20.1 |
| Percent styrene | 45.1 | 58.6 | 61.5 | 55.8 |
| Tensile strength, kg./cm.$^2$: | | | | |
| (a) at break | 187 | 365 | 303 | 245 |
| (b) at yield | | 450 | 436 | 309 |
| Elongation, percent: | | | | |
| (a) at break | 65 | 133 | 105 | 13.1 |
| (b) at yield | | 5.5 | 5.8 | 5.2 |
| Flexural strength, kg./cm.$^2$ | 295 | 576 | 612 | 643 |
| Flexural modulus, kg./cm.$^2$ | 13,370 | 17,660 | 16,930 | 19,710 |
| Impact strength, ft. lbs./in.: | | | | |
| (a) at 25° C | 10.1 | 0.4 | 0.28 | 0.44 |
| (b) at −30° C | 10.0 | 0.32 | 0.28 | 0.42 |
| Rockwell "R" Hardness | 41 | 103 | 102 | 92 |

The above copolymers show an excellent retention of impact strength at low temperatures. Over the same temperature range, the impact strength of commercial ABS decreased by more than 56%, from 3.9 to 1.7 ft. lbs./in.

EXAMPLE III

Four polymers were prepared by the procedure used for polymers 1–3 of Example II, except that in the second polymerization step 0.44 part of tertiary dodecyl mercaptan was additionally added. The initial monomer charge for polymers 1 and 3 was 90 parts butadiene and 10 parts acrylonitrle; the initial monomer charge for polymers 2 and 4 was 80 parts butadiene and 20 parts acrylonitrile.

The properties of the transparent low temperature impact resistant copolymers are presented in Table III.

TABLE III

| | Polymer Sample | | | |
|---|---|---|---|---|
| | 1 | 2 | 3 | 4 |
| Polymer Composition: | | | | |
| Percent acrylonitrile | 19.9 | 23.1 | 23.1 | 23.0 |
| Percent butadiene | 35.9 | 29.7 | 20.3 | 10.0 |
| Percent styrene | 44.2 | 47.2 | 56.6 | 67.0 |
| Tensile strength, kg./cm.$^2$: | | | | |
| (a) at break | 223 | 131 | 225 | 324 |
| (b) at yield | | | 259 | 444 |
| Elongation, percent: | | | | |
| (a) at break | 186 | 256 | 54 | 14.0 |
| (b) at yield | | | 4.6 | 5.9 |
| Flexural strength, kg./cm.$^2$ | 161 | 103 | 372 | 818 |
| Flexural modulus, kg./cm.$^2$ | 7,050 | 4,480 | 14,790 | 25,520 |
| Impact strength, ft. lbs./in.: | | | | |
| (a) at 25° C | 8.1 | 11.5 | 6.8 | 0.30 |
| (b) at −30° C | 9.9 | 11.5 | 6.2 | 0.26 |
| (c) at −40° C | 11.5 | 11.5 | 5.8 | 0.25 |
| Rockwell "R" Hardness | 0 | 0 | 78 | 111 |

The above copolymers show an excellent retention of impact strength at sub-zero temperatures. The impact strength of commercial ABS decreases from 3.9 at 25° C. to 0.65 at −40° C., a decrease of more than 80%.

EXAMPLE IV

The same general procedure as Example III was used in preparing the polymers. Thus in the first polymerization step, a monomer charge of 80 parts butadiene and 20 parts acrylonitrile was used, 1.0 part of potassium oleate and 3.0 parts of a potassium salt of a disproportionated abietic acid were substituted for 4.0 parts of sodium stearate, 0.05 part of hexadecyl mercaptan was included in the polymerization charge and the polymerization was conducted at 3° C.

In the second polymerization step, the amount of tertiary dodecyl mercaptan added was varied, as shown below.

The polymers were quantitatively tested for transparency. The light transmission of 0.012 mm. thick specimens was measured at 420 and 620 millimicrons and reported as percent of incident light transmitted.

The properties of the transparent low temperature impact resistant copolymers are presented in Table IV.

TABLE IV

| | Polymer | | |
|---|---|---|---|
| | 1 | 2 | 3 |
| Tertiary dodecyl mercaptan added, parts | 0.044 | 0.44 | 0.87 |
| Polymer Composition: | | | |
| Percent acrylonitrile | 25.8 | 25.3 | 24.8 |
| Percent butadiene | 16.1 | 17.1 | 15.5 |
| Percent styrene | 58.1 | 57.6 | 59.7 |
| Tensile strength, kg./cm.$^2$: | | | |
| (a) at break | | 230 | 241 |
| (b) at yield | 366 | 328 | 358 |
| Elongation, percent: | | | |
| (a) at break | | 28 | 26 |
| (b) at yield | 7.3 | 8.5 | 7.6 |
| Flexural strength, kg./cm.$^2$ | 529 | 534 | 535 |
| Flexural modulus, kg./cm.$^2$ | 21,910 | 16,910 | 16,900 |
| Impact strength, ft. lbs./in.: | | | |
| (a) at 25° C | 0.52 | 0.56 | 0.44 |
| (b) at −30° C | 0.46 | 0.58 | 0.32 |
| Rockwell "R" Hardness | 98 | 98 | 95 |
| Light transmission, percent: | | | |
| (a) at 620 millimicrons | 86.9 | 86.6 | 84.6 |
| (b) at 420 millimicrons | 80.5 | 80.5 | 70.0 |

The results show that the above copolymers have excellent transparency. Commercial ABS, by contrast, has light transmission values of 11.0 and 3.0 percent, respectively.

The effect of increasing the amount of modifier added with the second monomer charge was to further improve the thermoplastic character of the copolymer.

EXAMPLE V

Polymerization was conducted at 3° C. for 16 hours to a conversion of 78% using the recipe given below.

| | Parts |
|---|---|
| Butadiene | 50.0 |
| Styrene | 50.0 |
| Potassium oleate | 1.0 |
| Potassium salt of a disproportionated abietic acid | 4.0 |
| Potassium chloride | 0.2 |
| Trisodium phosphate | 0.3 |
| Sodium hydrosulfite | 0.05 |
| Sodium sulfoxylate formaldehyde | 0.023 |
| Ethylenediamine tetracetic acid | 0.06 |
| Ferrous sulfate heptahydrate | 0.005 |
| 2,5 - dimethyl-2-tertiarybutylperoxy-5-hydroperoxy hexane | 0.05 |

Unreacted monomers were substantially removed by bubbling nitrogen through the latex. 35 parts of styrene, 65 parts of acrylonitrile, 0.35 part of potassium salt of a disproportionated abietic acid, 0.09 part of potassium oleate, 0.044 part of sodium hydrosulfite and 0.044 part of tertiarydodecyl mercaptan dissolved in 174 parts of water were added to the latex. Polymerization was continued for 16 hours at 80° C. The reaction was stopped and the polymer recovered by the procedures of Example II.

The properties of the transparent copolymer are recorded in Table V.

TABLE V

| | |
|---|---|
| Polymer composition (percent) | |
|    Acrylonitrile | 21.8 |
|    Butadiene | 14.0 |
|    Styrene | 64.2 |
| Tensile strength (kg./cm.$^2$) | |
|    (a) At break | 269 |
|    (b) At yield | 269 |
| Elongation (percent) | |
|    (a) At break | 61.3 |
|    (b) At yield | 9.3 |
| Flexural strength (kg./cm.$^2$) | 347 |
| Flexural modulus (kg./cm.$^2$) | 12,770 |
| Impact strength (ft. lbs./in.) | |
|    (a) At 25° C. | 11.6 |
|    (b) At −30° C. | 0.6 |
| Rockwell "R" Hardness | 69 |
| Light transmission (percent) | |
|    (a) At 620 millimicrons | 94.0 |
|    (b) At 420 millimicrons | 88.0 |

What is claimed is:

1. The process of polymerizing in aqueous emulsion at least three monomers in the presence of from about 0.02 to 0.4 parts per 100 parts monomers of an organic diperoxide compound which comprises the consecutive steps of (a) polymerizing a conjugated diolefin or a mixture comprised of a conjugated diolefin and at least one monomer selected from an aryl olefin and a nitrile of an acrylic acid at a temperature of about −5 to about 20° C., (b) adding at least one monomer selected from a conjugated diolefin, an aryl olefin and a nitrile of an acrylic acid and (c) polymerizing the added monomers at a temperature of 50 to 95° C., to produce a transparent thermoplastic graft copolymer, said organic diperoxide compound being characterized by two peroxy groups independently activatable at different temperatures.

2. The process of claim 1 in which the organic diperoxide is 2,5-dimethyl-2-tertiarybutylperoxy-5-hydroperoxy hexane.

3. The process of claim 2 in which the conjugated diolefin in step (a) is butadiene-1,3.

4. The process of claim 3 in which the monomer or monomers copolymerized with butadiene-1,3 in step (a) is or are selected from styrene and acrylonitrile.

5. The process of claim 4 in which the monomers in step (b) are styrene and acrylonitrile.

References Cited

UNITED STATES PATENTS

| 3,137,681 | 6/1964 | Orr | 260—82.1 |
| 3,293,233 | 12/1966 | Erchak et al. | 260—94.9 |
| 3,446,873 | 5/1969 | Saito et al. | 260—880 |
| 3,449,471 | 6/1969 | Weitzel et al. | 260—880 |

JOSEPH L. SCHOFER, Primary Examiner

R. A. GAITHER, Assistant Examiner

U.S. Cl. X.R.

260—880